US010506267B2

(12) United States Patent
Robert

(10) Patent No.: US 10,506,267 B2
(45) Date of Patent: *Dec. 10, 2019

(54) CONTENT BASED PARTITIONING OF DIGITAL MEDIA CONTENT

(71) Applicant: Disney Enterprises, Inc., Burbank, CA (US)

(72) Inventor: Arnaud Robert, Simi Valley, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/996,173

(22) Filed: Jan. 14, 2016

(65) Prior Publication Data
US 2016/0134905 A1    May 12, 2016

Related U.S. Application Data

(63) Continuation of application No. 13/584,056, filed on Aug. 13, 2012, now Pat. No. 9,282,348.

(51) Int. Cl.
H04N 21/2387    (2011.01)
H04N 21/235     (2011.01)
H04N 21/435     (2011.01)
H04N 21/2343    (2011.01)
H04N 21/845     (2011.01)
H04N 21/234     (2011.01)

(52) U.S. Cl.
CPC ....... H04N 21/2387 (2013.01); H04N 21/235 (2013.01); H04N 21/23418 (2013.01); H04N 21/234309 (2013.01); H04N 21/435 (2013.01); H04N 21/8456 (2013.01)

(58) Field of Classification Search
CPC ......... H04N 21/234309; H04N 21/235; H04N 21/435; H04N 21/8456; H04N 21/23418; H04N 21/2387
USPC ....................................................... 386/329
See application file for complete search history.

(56) References Cited

U.S. PATENT DOCUMENTS

2005/0262257 A1* 11/2005 Major ............. H04N 21/25808
                                                    709/231
2007/0002946 A1*  1/2007 Bouton .................. H04N 19/15
                                                    375/240.01
2012/0002717 A1*  1/2012 Ma .................... H04N 21/44209
                                                    375/240.01

FOREIGN PATENT DOCUMENTS

CN          10125377 A    8/2008

* cited by examiner

Primary Examiner — Thai Q Tran
Assistant Examiner — Jose M Mesa
(74) Attorney, Agent, or Firm — Farjami & Farjami LLP

(57) ABSTRACT

There is provided a content based partitioning system and a method for use in performing content based partitioning of digital media content. In one implementation, such a content based partitioning system includes a system processor, a system memory, and a content based partitioning module stored in the system memory. The content based partitioning module, under control of the system processor, is configured to receive encoded digital media content corresponding to the digital media content, to receive encoding parameters used to encode the encoded digital media content, and to utilize the encoding parameters and the encoded digital media content to identify partition boundaries in the encoded digital media content.

12 Claims, 6 Drawing Sheets

CONTENT BASED PARTITIONING OF DIGITAL MEDIA CONTENT

This application is a Continuation of U.S. application Ser. No. 13/584,056, filed Aug. 13, 2012, which is hereby incorporated by reference in its entirety.

BACKGROUND

Consumers seeking to enjoy digital media content in the form of movies, television (TV) programming, or videos, for example, have more options for accessing such content than ever before. In addition to relatively well established channels for digital media content distribution, such as use of a video on demand (VOD) service, or purchase or rental of a physical media on which the content is stored, a variety of other options for obtaining access to desired content now exist as well. For instance, there is an ever-increasing variety of content available over the Internet, enabling consumers to have desired content streamed or downloaded to a personal computer (PC) at home, or to a mobile communication device while traveling or otherwise away from home.

The increased choice enjoyed by the consumers of a wide variety of digital media content has created significant competition for their attention and patronage among producers of that content. In a competitive environment in which so much content is so readily available, one way for content producers to set their own products apart in the marketplace is to provide content that enables an enhanced viewing experience.

SUMMARY

There are provided systems and methods for performing content based partitioning of digital media content, substantially as shown in and/or described in connection with at least one of the figures, and as set forth more completely in the claims.

DETAILED DESCRIPTION

Figure 1:
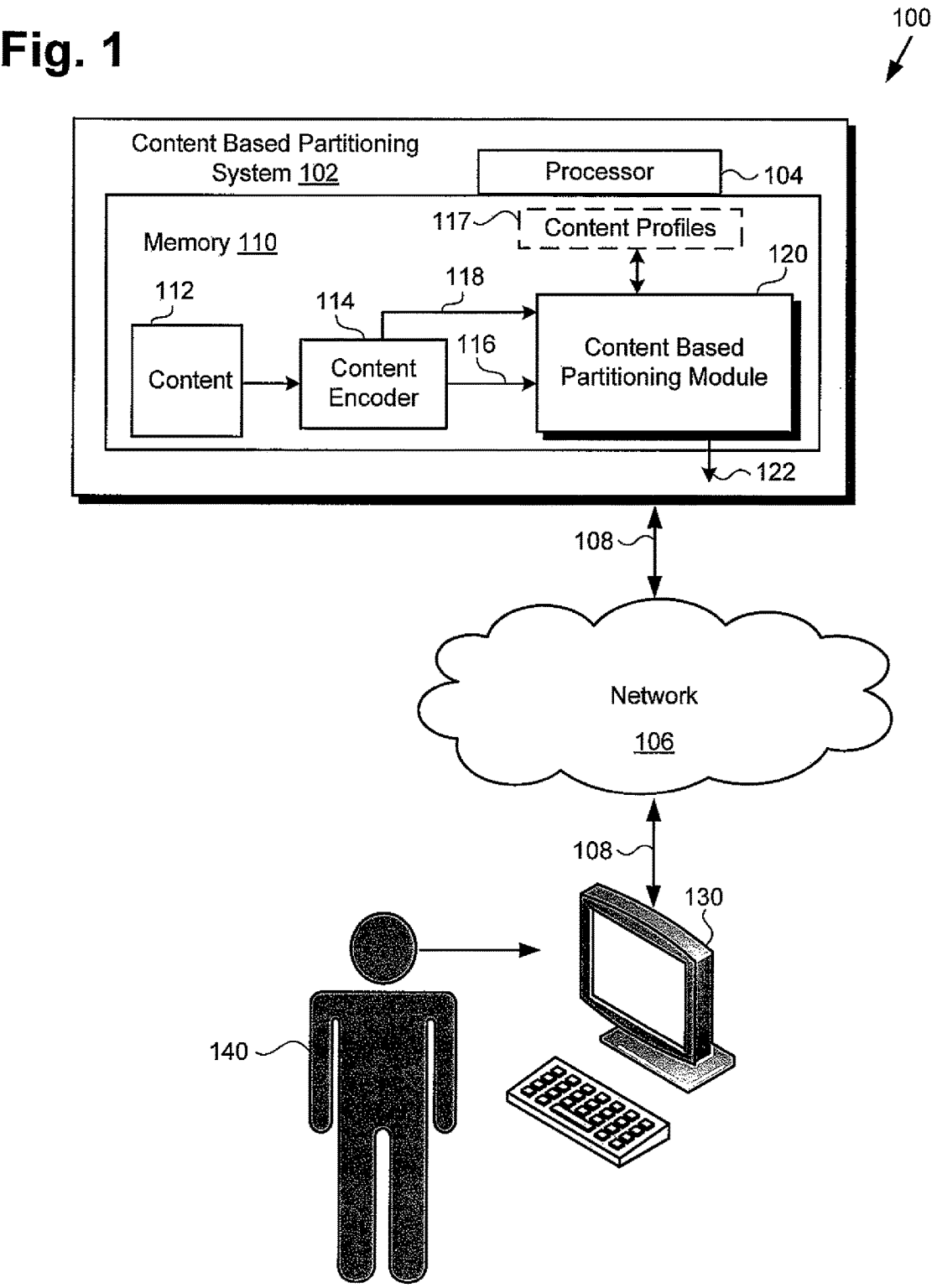
FIG. 1 shows a diagram of an exemplary content based partitioning system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, the increased choices for accessing digital media content now available to consumers has created significant competition for consumer patronage among content producers. As further explained, one way for content producers to set their own products apart in a competitive marketplace is to provide content that enables an enhanced viewing experience. For example, it may be desirable to improve the way that digital media content is partitioned or segmented prior to distribution, which enhances a consumer's experience when searching and/or navigating through the digital media content, i.e., the partitioning/segmentation may more closely align the user experience of searching and/or navigating through the digital media content with the preferences of consumers.

In conventional video streaming systems, each video program is typically segmented into equal and fixed time segments, such as 1-second segments, 2-second segments, 3-second segments, 4-second segments, 5-second segments, or 6-second segments, for example, without regard to the content changes or scene changes in the video program.

It is noted that, as used in the present application, the terms "partition," "partitioned," and "partitioning" refer to the subdivision of a cognizably integral unit of digital media content, such as a movie, a video clip, or an episode of television (TV) programming, for example, into multiple discrete blocks of digital media content data. Partitioning of digital media content may take the form of segmentation of the digital media content into many relatively short data blocks to enable streaming of the digital media content and/or to render the digital media content searchable by a user. For example, partitioning in the form of segmentation can ensure smoother video distribution over the Internet as each segment is offered in multiple bit-rates and selected according to the consumer's available bandwidth.

As another example, segmentation may render the digital media content searchable by enabling a user to navigate forward and backward within the digital media content with significant precision. In addition, segmentation may render the digital media content searchable by enabling fast-forward and rewind functionalities for the user. Alternatively, or in addition, partitioning of the digital media content may take the form of chaptering of digital media content made available for download to a user, or digital media content stored and distributed on a physical media such as an optical disc or flash media drive, for example. In one implementation, chaptering may be performed as part of the authoring process. Other exemplary applications for content based partitioning include using the partitioning for indexing, using the partitioning for metadata generation, using the partitioning as entry to a multi bit-rate streaming solution used for trick modes in a digital video recorder (DVR) or other media storage and/or playback system.

According to various implementations of the present inventive concepts, a content based partitioning system for distributing digital media content includes a content based partitioning module stored in the system memory. The content based partitioning module, under control of the system processor, is configured to receive encoded digital media content corresponding to the digital media content being distributed. In addition, the content based partitioning module is configured to receive the encoding parameters used to encode the encoded digital media content and to utilize the encoding parameters as well as the encoded digital media content to identify partition boundaries in the encoded digital media content. As a result, the content based partitioning module enables the content based partitioning system to partition the encoded digital media content in a content aware manner so as to enhance a user experience. That is to say, implementations of the present concepts can advantageously enable partitioning of digital media content at partition boundaries coinciding with or corresponding to inherent transitions within the digital media content itself.

FIG. 1 shows a diagram of exemplary content based partitioning system 102, according to one implementation. As shown in FIG. 1, content distribution environment 100 includes content based partitioning system 102, communications network 106, client system 130, and consumer or user 140 (hereinafter "user 140"). As further shown in FIG. 1, content based partitioning system 102 includes system processor 104, and system memory 110 having stored therein digital media content 112, encoder 114, and content based partitioning module 120. In addition, FIG. 1 shows content profiles database 117 residing in memory 110. It is noted that content profiles database 117 is represented as a dashed block to indicate that, in some implementations, a content based partitioning system may not utilize content profiles. Also shown in FIG. 1 are encoded digital media content 116, encoding parameters 118 used by encoder 114 to encode encoded digital media content 116, and network communication links 108 interactively connecting client system 130 and content based partitioning system 102 via communications network 106.

It is noted that digital media content 112 may take a variety of forms. For example, in some implementations, digital media content 112 may be video content in the form of raw video, or in the form of a high bit-rate master. In implementations in which digital media content 112 is provided as a high bit-rate master, digital media content 112 is an already encoded digital media content, albeit typically encoded at a very high bit-rate. In such implementations, digital media content 112 may be received by content based partitioning module 120 without being first encoded by encoder 114. In other such implementations, however, encoder 114 may further process the high bit-rate master by re-encoding digital media content 112 at a different bit rate or rates.

It is further noted that although FIG. 1 depicts digital media content 112, encoder 114, content profiles database 117, and content based partitioning module 120 as being mutually co-located in system memory 110, that representation is merely provided as an aid to conceptual clarity. More generally, content based partitioning system 102 may include one or more media servers, which may be co-located, or may form an interactively linked but distributed system. As a result, system processor 104 and system memory 110 may correspond to distributed processor and memory resources within content based partitioning system 102. Thus, it is to be understood that one or more of digital media content 112, encoder 114, content profiles database 117, and content based partitioning module 120 may be stored remotely from the other(s) within the distributed memory resources of content based partitioning system 102.

According to the implementation shown by FIG. 1, user 140 may utilize client system 130 to consume content provided by content based partitioning system 102 over communications network 106. In one such implementation, content based partitioning system 102 may correspond to one or more web servers, accessible over a packet network such as the Internet, for example. Alternatively, content based partitioning system 102 may correspond to one or more media servers supporting a local area network (LAN), or included in another type of limited distribution network.

It is also noted that although client system 130 is shown as a personal computer (PC) in FIG. 1, that representation is provided merely as an example. In other implementations, client system 130 may be another type of mobile or stationary personal communication device or system. For example, client system 130 may take the form of a tablet computer, a physical media player, such as a Digital Video Disc (DVD) or Blu-ray™ disc player, a smartphone, a digital media player, or a gaming console.

Digital media content 112 may be video content or audio-visual content in the form of a video clip, movie, or TV episode, for example. Encoder 114 is configured to encode digital media content 112 using any suitable encoding format, as known in the art. For example, encoder 114 may be configured to produce encoded digital media content 116 from video content corresponding to digital media content 112 using the Moving Pictures Expert Group 2 (MPEG2) format, or the H.264, VP6, or VP8 formats.

As shown in FIG. 1, content based partitioning module 120, under the control of system processor 104, receives encoded digital media content 116, corresponding to digital media content 112, from encoder 114. As further shown in FIG. 1, content based partitioning module 120 also receives encoding parameters 118 used by encoder 114 to encode digital media content 112 into encoded digital media content 116 (e.g., the respective MPEG2, H.264, VP6, or VP8 encoding parameters). Content based partitioning module 120 is configured to utilize encoding parameters 118 and encoded digital media content 116 to identify partition boundaries 122 for use in partitioning encoded digital media content 116.

In addition, in some implementations, content based partitioning module 120 may be configured to utilize a content profile associated with digital media content 112 and/or encoded digital media content 116, in combination with encoding parameters 118 and encoded digital media content 116, to identify partition boundaries 122. Such a content profile may be stored in content profiles database 117, for example, accessible to content based partitioning module 120. Such content profiles might correspond to a genre characterizing digital media content 112. For example, where digital media content 112 is in the form of animation content, an animation content profile could be used to analyze encoding parameters differently than would be the case if the content were identified as action adventure content having an associated action adventure content profile. In other words, in addition to using encoded content 116 and encoding parameters 118, the use of content specific profiles may be used to inform the process of identifying partition boundaries 122.

Content based partitioning system 102 may then partition encoded digital media content 116 using partition boundaries 122 identified by content based partitioning module 120, and transfer the partitioned content to client system 130 over communications network 106 using network communication links 108. According to one implementation, content based partitioning system 102 may partition encoded digital media content 116 by segmenting encoded digital media content 116 to produce searchable content, which content based partitioning system 102 may then stream to client system 130 over communications network 106.

As explained above, partitioning in the form of segmentation may render encoded digital media content 116 searchable by enabling user 140 to navigate forward and backward within the content with significant precision using client system 130. In addition, segmentation may render encoded digital media content 116 searchable by enabling user 140 to fast-forward and rewind encoded digital media content 116 through use of client system 130.

Figure 2:
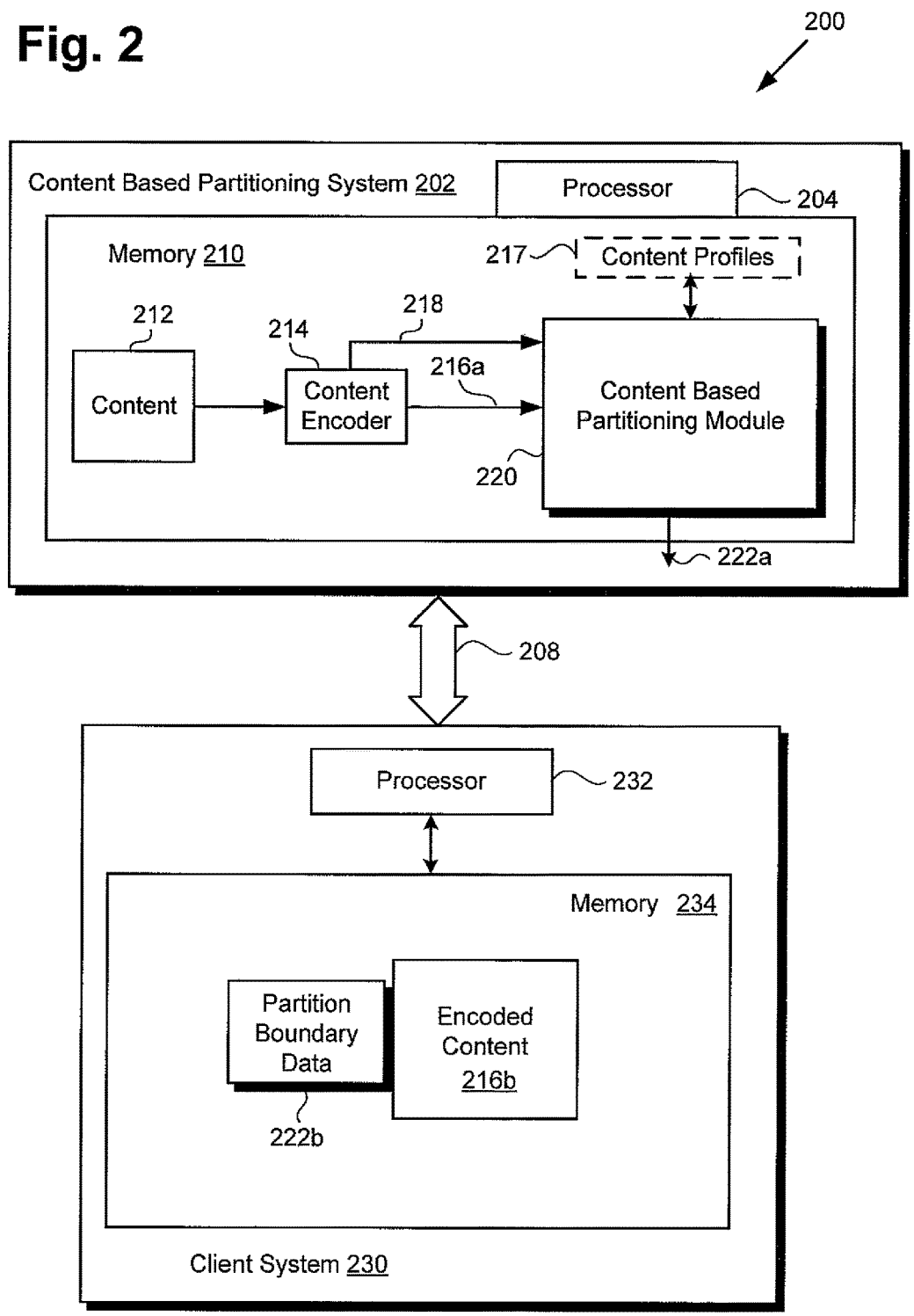
FIG. 2 shows another exemplary implementation of a content based partitioning system.

Referring to FIG. 2, FIG. 2 shows another exemplary implementation of a content based partitioning system as content based partitioning system 202. Content distribution environment 200 includes content based partitioning system 202 in communication with client system 230 over network communication link 208. Content based partitioning system 202 is shown to include system processor 204, and system memory 210 having stored therein digital media content 212, encoder 214, content profiles database 217, and content based partitioning module 220. As shown in FIG. 2, content based partitioning module 220 receives encoded digital media content 216a and encoding parameters 218 as inputs from encoder 214, and outputs partition boundaries 222a.

Content based partitioning system 202, including system processor 204 and system memory 210, in FIG. 2, corresponds to content based partitioning system 102, including system processor 102 and system memory 110, in FIG. 1. Moreover, digital media content 212, encoder 214, encoded digital media content 216a, encoding parameters 218, content profiles database 217, and content based partitioning module 220 providing partition boundaries 222a, in FIG. 2, correspond respectively to digital media content 112, encoder 114, encoded digital media content 116, encoding parameters 118, content profiles database 117, and content based partitioning module 120 providing partition boundaries 122, in FIG. 1.

In addition, client system 230, in FIG. 2, corresponds to client system 130, in FIG. 1. As shown in FIG. 2, client system 230 includes client processor 232 and client memory 234. Also shown in FIG. 2 are encoded digital media content 216b and associated partition boundary data 222b. According to the implementation shown in FIG. 2, the presence of encoded digital media content 216b and associated partition boundary data 222b in client memory 234 corresponds to their download to client system 230 from content based partitioning system 202 over network communication link 208. It is noted that network communication link 208 is shown as a two-way communication, to represent possible ongoing communication between client system 230 and content based partitioning system 202.

Client processor 232 may be the central processing unit for client system 230, for example, in which role client processor 232 runs the client operating system. Client processor 232 may further manage retrieval and use of partition boundary data 222b to partition encoded digital media content 216b residing in client memory 234. Thus, as represented by FIGS. 1 and 2, content based partitioning system 102/202 may use partitioning boundaries 122/222a to partition encoded digital media content 116/216a, for example by segmenting digital media content 116 to produce searchable content, and stream that searchable content to client system 130. In addition, or alternatively, content based partitioning system 102/202 may download partition boundary data 222b as associated data with encoded digital content 222b to client memory 234 for use by client system 230.

Figure 3:
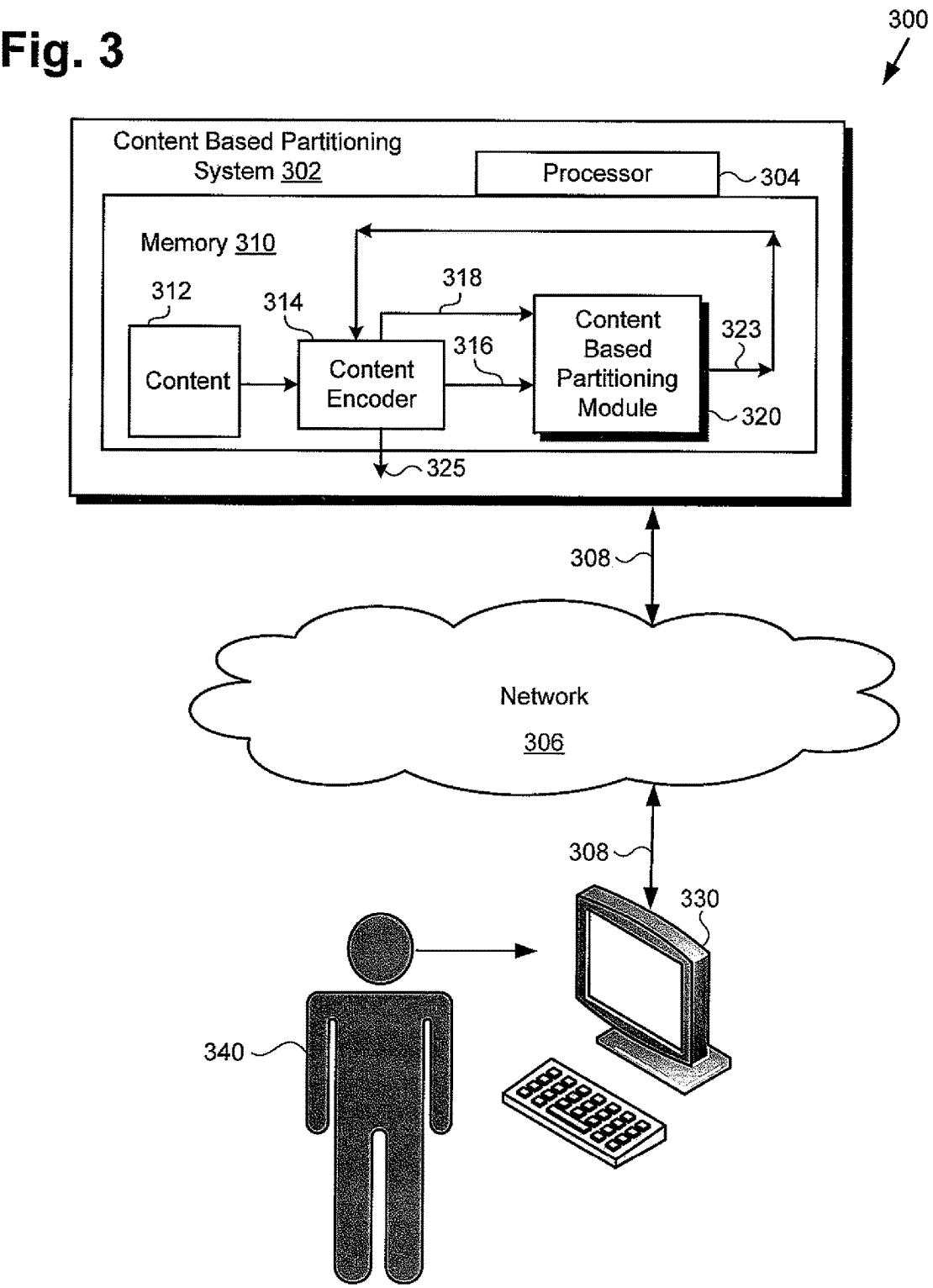
FIG. 3 shows yet another exemplary implementation of a content based partitioning system.

FIG. 3 shows a diagram of exemplary content based partitioning system 302, according to one implementation. As shown in FIG. 3, content distribution environment 300 includes content based partitioning system 302, communications network 306, client system 330, and user 340. As further shown in FIG. 3, content based partitioning system 302 includes system processor 304, and system memory 310 having stored therein digital media content 312, encoder 314, and content based partitioning module 320. Also shown in FIG. 3 are encoded digital media content 316, encoding parameters 318 used by encoder 314 to encode encoded digital media content 316, and network communication links 308 interactively connecting client system 330 and content based partitioning system 302 via communications network 306.

Content based partitioning system 302, including system processor 304 and system memory 310, in FIG. 3, corresponds in general to content based partitioning system 102, including system processor 102 and system memory 110, in FIG. 1. Moreover, digital media content 312, encoder 314, encoded digital media content 316, encoding parameters 318, and content based partitioning module 320, in FIG. 3, correspond respectively to digital media content 112, encoder 114, encoded digital media content 116, encoding parameters 118, and content based partitioning module 120, in FIG. 1.

Absent from the implementation shown by FIG. 3 is a content profiles database corresponding to content profiles database 117, in FIG. 1. However, the omission of that feature is merely by way of example, and in other implementations, content based partitioning system 302 may include such a content profiles database. According to the specific implementation of FIG. 3, encoder 314 is configured to re-encode partitioned content 323 provided as an output of content based partitioning module 320, prior to its distribution as partitioned and encoded content 325 over network 306.

Moreover, as noted above, in implementations in which digital media content 312 is provided as a high bit-rate master, rather than raw content, digital media content 312 may be received by content based partitioning module 320 without first being encoded by encoder 314. In such implementations, encoder 314 may be utilized to re-encode partitioned content 323 without first encoding digital media content 312. However, as shown by FIG. 3, in some implementations, encoder 314 may be used to encode or re-encode digital media content 312 prior to its partitioning by content based partitioning module 320, and to subsequently re-encode partitioned content 323 to produce partitioned and encoded content 325. As a result, the present concepts can by applied so as to provide adaptive streaming of partitioned and encoded content 325 by utilizing multiple bit-rates to re-encode partitioned content 323 after partitioning of encoded content 316 by content based partitioning module 320.

Figure 4:
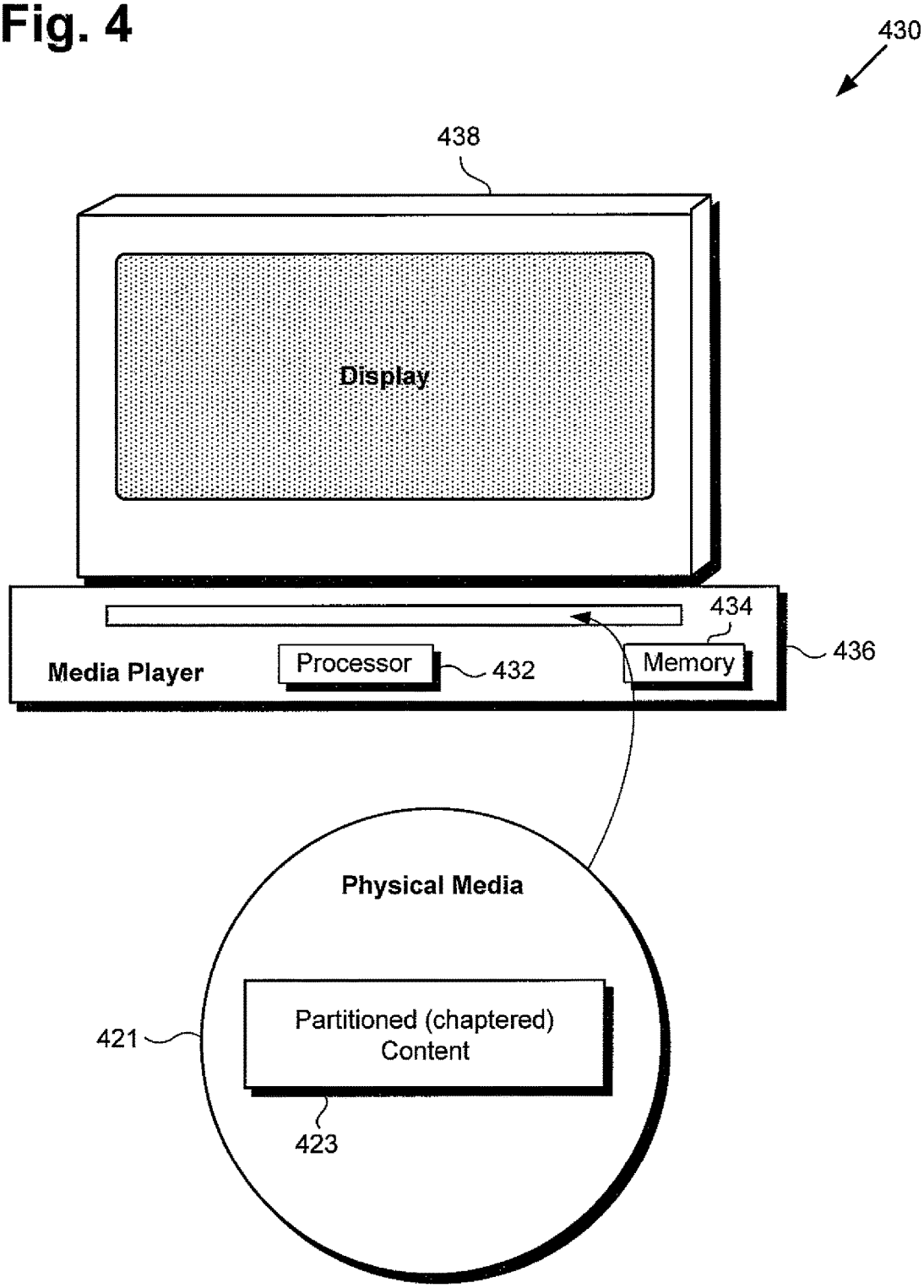
FIG. 4 shows an exemplary client system and a physical media including digital media content having undergone content based partitioning, according to one implementation.

Moving now to FIG. 4, FIG. 4 shows exemplary client system 430 and physical media 421 including digital media content 423 having undergone content based partitioning, according to one implementation. Client system 430, in FIG. 4, includes media player 436 including client processor 432 and client memory 434, interactively linked to display 438. Also shown in FIG. 4 is physical media 421 having partitioned digital media content 423 stored thereon.

As shown in FIG. 4, physical media 421 may be an optical disc, such as a DVD, or a high-definition Blu-ray™ disc, for example. According to the implementation shown by FIG. 4, partitioned content 423 has been partitioned by being chaptered for use on client system 430. In other words, in implementations corresponding in general to FIG. 4, a content based partitioning system, such as content based partitioning system 102, in FIG. 1, has partitioned encoded digital media content 116 using partition boundaries 122 identified by content based partitioning module 120. In addition, the content based partitioning system has stored that partitioned content, as chaptered digital media content 423, on physical media 421 configured for playback by client system 430, and distributed physical media 421 using a distribution channel other than download or digital streaming.

The present inventive concepts will now be further described with reference to FIG. 5, which presents flowchart 500 describing an exemplary method for performing content based partitioning of digital media content. With respect to the method outlined in FIG. 5, it is noted that certain details and features have been left out of flowchart 500 in order not to obscure the discussion of the inventive features in the present application.

Figure 5:
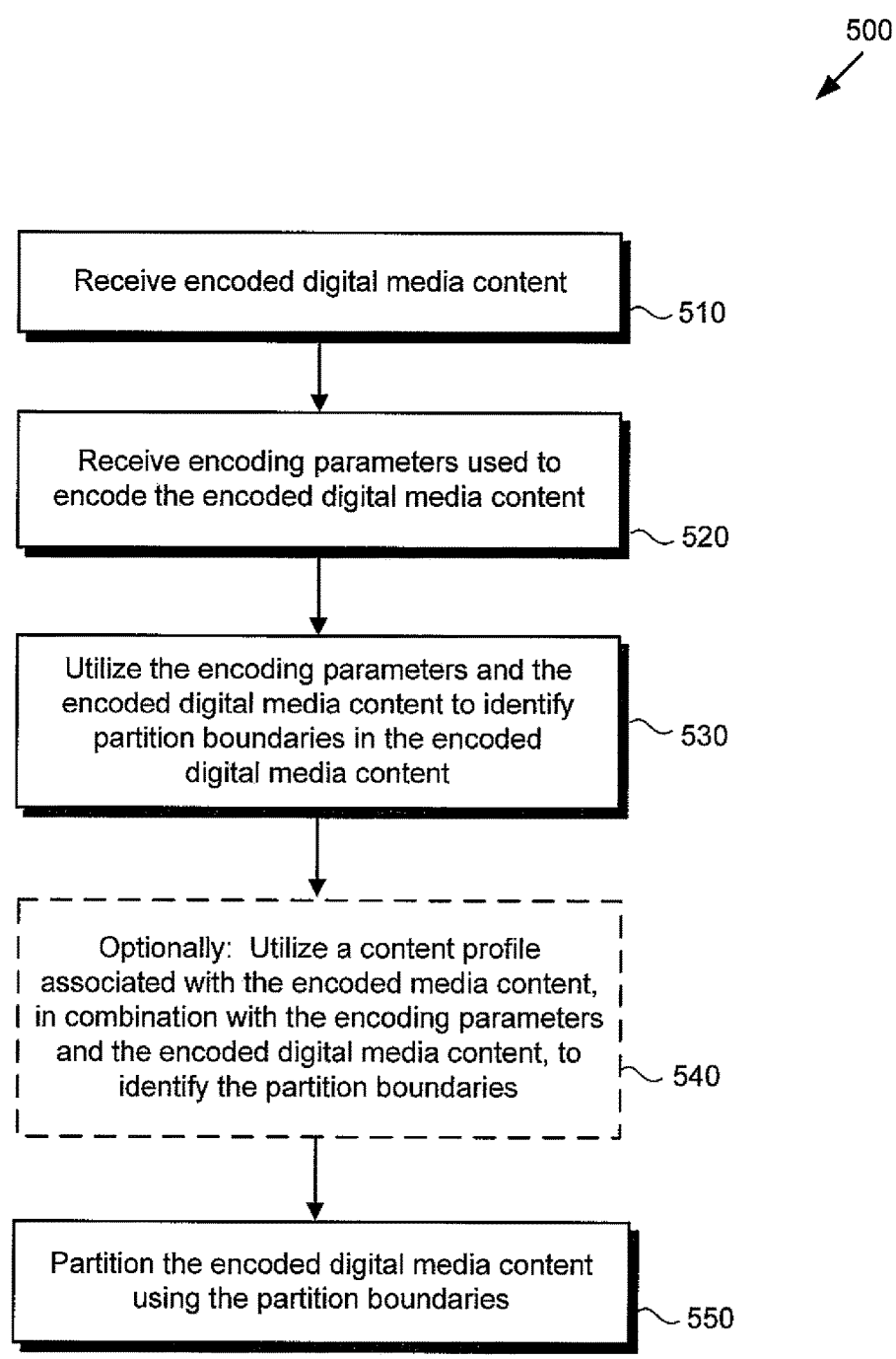
FIG. 5 is a flowchart presenting an exemplary method for performing content based partitioning of digital media content.

Referring to FIG. 5 in combination with FIGS. 1 and 2, flowchart 500 begins with receiving encoded digital media content 116/216a (510). According to the implementations shown in FIGS. 1 and 2, encoded digital media content 116/216a is received by content based partitioning module 120/220 after the encoding of digital media content 112/212 by encoder 114/214. As explained above by reference to FIG. 1, digital media content 112/212 may be video content or audio-visual content in the form of a video clip, movie, or TV episode.

Flowchart 500 continues with receiving encoding parameters used to encode encoded digital media content 116/216a (520). As shown in FIGS. 1 and 2, in addition to encoded digital media content 116/216a, content based partitioning module 120/220 also receives encoding parameters 118/218 from encoder 114/214. As explained above, encoder 114/214 may be configured to encode digital media content 112/212 using any suitable encoding format, such as MPEG2, H.264, VP6, or VP8, for example. As a specific example, where encoder 114/214 uses the MPEG2 format to encode digital media content 112/212 into encoded digital media content 116/216a, encoding parameters 118/218 would include the encoding parameters implemented by the MPEG2 codec. By analogy, when another encoding format is utilized by encoder 114/214, the encoding parameters implemented by the corresponding codec would be received by content based partitioning module 120/220 as encoding parameters 118/218 from encoder 114/214.

Flowchart 500 continues with utilizing encoding parameters 118/218 and encoded digital media content 116/216a to identify partition boundaries 122/222a in encoded digital media content 116/216a (530). Identification of partition boundaries 122/222a may be performed by content based partitioning module 120/220, which is shown to receive encoded digital media content 116/216a and encoding parameters 118/218 as inputs, and to output partition boundaries 122/222a.

According to the present concepts, the specific encoding of encoded digital media content 116/216a, when considered in view of encoding parameters 118/218, can yield information regarding transitions inherent to digital media content 112/212. For example, where digital media content 112/212 is video content, the combination of encoded digital media content 116/216a and encoding parameters 118/218 can be used to identify transitions between visually rich or dynamic portions of digital media content 112/212 and less rich or dynamic portions. Thus, in one implementation, one or more of partition boundaries 122/222a may be identified based on a substantial change in the content richness of digital media content 112/212 near the respective partition boundary.

In effect, the present solution can be used to identify inherently existing content transitions within digital media content 112/212, and to identify partition boundaries 122/222a so as to correspond to those existing content transitions in a content aware manner. Because the content based partitioning approach disclosed herein is responsive to detected transitions in the content itself, rather than to an arbitrary metric such as elapsed time or frame count, the segments or partitions produced according to the present method can be expected to be non-uniform in time duration, frame count, or both.

In some implementations, flowchart 500 continues with optionally utilizing a content profile associated with content 112/212 and/or encoded digital content 116/216a, in combination with encoding parameters 118/218 and encoded digital media content 116/216a, to identify partition boundaries 122/222a (540). Identification of partition boundaries 122/222a may be performed by content based partitioning module 120/220, which is shown to receive a content profile from content profiles database 117/217, as well as encoded digital media content 116/216a and encoding parameters 118/218 as inputs, and to output partition boundaries 122/222a.

As explained above, a content profile may correspond to a genre identified in metadata of digital media content 112/212. Where digital media content 112/212 is in the form of comedy content, a comedy content profile could be used to analyze encoding parameters differently than would be the case if the content were identified as sports content having an associated sports specific content profile, such as a baseball content profile, or golf content profile.

Flowchart 500 continues with partitioning encoded digital media content 116/216a using partition boundaries 122/222a (550). For example, the process can segment a video using Groups of Pictures (GOPs) derived from the video encoding. Some videos are encoded using I-frames, P-frames, and B-frames. Each GOP can be a group of frames from one I-frame to another I-frame. Partitioning a video every ten (10) I-frames, for example, may provide user 140 with a smoother visual transition when forwarding or rewinding a video. Such a process may be used for multi-pass encoding: using GOPs as a segmenting index for every pass. There are several possible multi-pass encoding techniques. One such technique is to use intrinsic knowledge of content changes, as described herein. This may be described as video content based segmentation, which can utilize different time intervals for different segments. Users, such as user 140, typically want to navigate forward or backward in the video content to the next scene change or past the next scene change.

Figure 6:
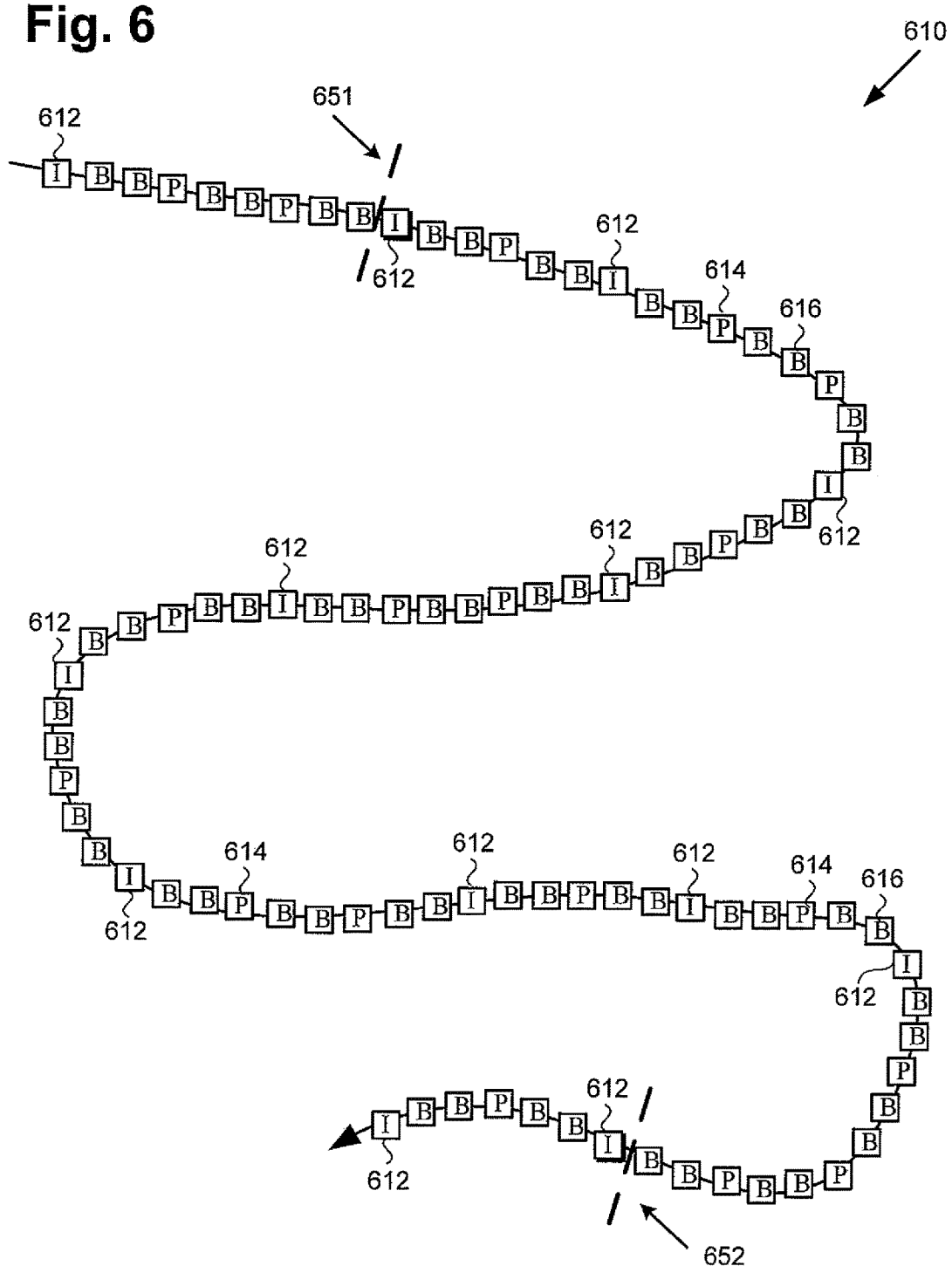
FIG. 6 shows an exemplary encoded video stream including partition boundaries identified using a method for performing content based partitioning of digital media content, according to one implementation.

Referring, for example, to FIG. 6, FIG. 6 shows exemplary encoded video stream 610 including partition boundaries 651 and 652 identified using a method for performing content based partitioning of digital media content. Encoded video stream 610 includes P-frames 614 intervening between successive I-frames 612, and further includes B-frames 616 intervening between I-frames 612 and P-frames 614, as well as between successive P-frames 614. According to the example implementation shown in FIG. 6, content based partition boundaries 651 and 652 are separated by 10 I-frames.

Referring once again to FIGS. 1 and 2, partitioning may be performed by content based partitioning system 102 in order to segment encoded digital media content 116 prior to streaming the content to client system 130 over communications network 106. In another implementation, the present method may be used to provide client system 20 with partition boundary data 222b associated with encoded digital media content 216b, as a digital media content and associated data download. Moreover, in one implementation, as shown in FIG. 4, partitioning may be performed by a content based partitioning system to chapter encoded digital media content so as to produce chaptered digital media content 423 stored on physical media 421. In that latter implementation, for example, content based partitioning can be used to enhance scene selection for a user of client system 430 by identifying inherent content transitions between scenes.

In some instances, the time granularity associated with the partition boundaries identified using the present content based partitioning method may be less fine than that of the substantially uniform partitions produced by alternative approaches. However, it is noted that to the extent that a user, such as user 140, in FIG. 1, uses time to navigate or search through encoded digital media content 116, time is used primarily as a proxy. In other words, when user 140 attempts to perform a fast-forward of rewind operation by specifying a target time on a timeline accompanying display of a movie or TV program, user 140 typically desires to navigate to the beginning of a coherent image sequence corresponding to the specified time, rather than to the precise time per se. Despite the possible non-uniformity of the partitions produced by the present content based partitioning approach, user 140 is more likely to navigate to another portion of encoded digital media content 116 at or near an existing content transition point. As a result, the user experience of searching or navigating through digital media content may be more responsive to the actual preferences of user 140, thereby enhancing the enjoyment of user 140 during consumption of encoded digital media content 116.

For example, a movie available for Internet streaming may be conventionally partitioned or segmented by equal time segments or an equal number of frames. But each partition does not correspond to a change from one scene to another scene in the movie. When a user jumps to the next partition or segment, it may be in the middle of the next scene in the movie. In contrast, using the partitioning methods described herein, the content may be partitioned at specific scene changes, which allows user 140 to jump precisely to the next scene.

Thus, from the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method comprising:
    receiving a digital media content;
    encoding the digital media content using encoding parameters to generate an encoded digital media content;
    identifying each of a plurality of partition boundaries in the encoded digital media content, using the encoding parameters, based on each one of transitions between a visually rich or dynamic portion of the encoded digital media content and a less visually rich or dynamic portion of the encoded digital media content;
    partitioning the encoded digital media content at the plurality of partition boundaries to generate a plurality of content partitions in the encoded digital media content, wherein the plurality of content partitions are non-uniform in time duration and frame count;
    producing a partitioned content using the plurality of partition boundaries; and
    making each of the plurality of partition boundaries searchable for a user navigating the partitioned content to jump to each one of the plurality of partition boundaries corresponding to one of the transitions, in response to a fast-forwarding or a rewinding by the user.

2. The method of claim 1 further comprising:
    utilizing a content profile associated with the digital media content, in combination with the encoding parameters and the encoded digital media content, to identify the plurality of partition boundaries in the encoded digital media content.

3. The method of claim 1, wherein the digital media content comprises audio-visual content.

4. The method of claim 1, wherein the digital media content comprises video content.

5. The method of claim 1 further comprising providing the encoded digital media content and data corresponding to the plurality of partition boundaries to a client system memory over a communications network.

6. The method of claim 1 further comprising streaming the partitioned content to a client system over a communications network.

7. A system comprising:
    a system processor and a system memory;
    a partitioning module stored in the system memory, the partitioning module, under control of the system processor, configured to:
    receive a digital media content;
    encode the digital media content to generate an encoded digital media content;
    identify each of a plurality of partition boundaries in the encoded digital media content, using the encoding parameters, based on each one of transitions between a visually rich or dynamic portion of the encoded digital media content and a less visually rich or dynamic portion of the encoded digital media content;
    partition the encoded digital media content at the plurality of partition boundaries to generate a plurality of content partitions in the encoded digital media content, wherein the plurality of content partitions are non-uniform in time duration and frame count;
    produce a partitioned content using the plurality of partition boundaries; and
    make each of the plurality of partition boundaries searchable for a user navigating the partitioned content, to jump to each one of the plurality of partition boundaries corresponding to one of the transitions, in response to a fast-forwarding or a rewinding by the user.

8. The system of claim 7, wherein the partitioning module, under control of the system processor, is further configured to:
    utilize a content profile associated with the digital media content, in combination with the encoding parameters and the encoded digital media content, to identify the plurality of partition boundaries in the encoded digital media content.

9. The system of claim 7, wherein the digital media content comprises audio-visual content.

10. The system of claim 7, wherein the digital media content comprises video content.

11. The system of claim 7, wherein the partitioning module, under control of the system processor, is further configured to:
provide the encoded digital media content and data corresponding to the plurality of partition boundaries to a client system memory over a communications network.

12. The method of claim 7 further comprising streaming the partitioned content to a client system over a communications network.

* * * * *